(12) United States Patent
Lundstrom

(10) Patent No.: US 7,341,288 B2
(45) Date of Patent: Mar. 11, 2008

(54) RESTRAINED SLEEVE PIPE COUPLING

(75) Inventor: Michael L. Lundstrom, Eastland, TX (US)

(73) Assignee: Ebaa Iron, Inc., Eastland, TX (US)

( * ) Notice: Subject to any disclaimer, the term of this patent is extended or adjusted under 35 U.S.C. 154(b) by 0 days.

(21) Appl. No.: 11/066,837

(22) Filed: Feb. 24, 2005

(65) Prior Publication Data

US 2005/0140139 A1    Jun. 30, 2005

Related U.S. Application Data

(62) Division of application No. 10/170,477, filed on Jun. 12, 2002, now abandoned.

(51) Int. Cl.
*F16L 21/02* (2006.01)
*F16L 55/00* (2006.01)
*F16L 25/00* (2006.01)

(52) U.S. Cl. ................. 285/369; 285/148.23; 285/343; 285/421; 285/104

(58) Field of Classification Search ........... 285/148.23, 285/148.24, 148.25, 148.26, 324, 337, 342–343, 285/348, 364, 368–369, 374, 404, 421, 104–405
See application file for complete search history.

(56) References Cited

U.S. PATENT DOCUMENTS

| | | | |
|---|---|---|---|
| 1,083,697 A | | 1/1914 | Neptune |
| 1,671,789 A | * | 5/1928 | Smith ....................... 285/130.1 |
| 1,898,623 A | | 2/1933 | Gammeter |
| 2,268,263 A | * | 12/1941 | Newell et al. ................. 285/15 |
| 2,744,769 A | | 5/1956 | Roeder et al. |
| 3,173,266 A | | 3/1965 | Shutt |
| 3,233,497 A | | 2/1966 | McCormick |
| 3,359,021 A | | 12/1967 | Wurzel et al. |
| 3,389,923 A | | 6/1968 | Love, Jr., et al. |
| 3,547,471 A | * | 12/1970 | Dunmire ..................... 285/337 |
| 3,594,023 A | | 7/1971 | Yano |
| 3,600,010 A | | 8/1971 | Downs et al. |
| 3,726,549 A | | 4/1973 | Bradley, Jr. |
| 3,781,042 A | | 12/1973 | Estlick |
| 3,782,683 A | * | 1/1974 | Lee et al. .................... 251/148 |
| 4,092,036 A | | 5/1978 | Sato et al. |
| 4,229,026 A | | 10/1980 | Seiler |
| 4,304,424 A | | 12/1981 | Hansen |
| 4,417,754 A | | 11/1983 | Yamaji et al. |

(Continued)

FOREIGN PATENT DOCUMENTS

JP    S52-72922    6/1977

*Primary Examiner*—James M. Hewitt
(74) *Attorney, Agent, or Firm*—Haynes and Boone, LLP

(57) ABSTRACT

A restrained sleeve coupling assembly for interconnecting pipe sections includes a generally cylindrical sleeve body, a generally cylindrical adaptor body and opposed end rings which are sleeved over the respective pipe sections to be joined. The generally cylindrical sleeve body has opposed gasket engaging surfaces adjacent opposite ends of the sleeve body for receiving fluid sealing gaskets forcibly engaged with the sleeve body, the adaptor body and one of the opposed end rings. The adaptor body includes a gasket engaging surface for receiving a fluid sealing gasket forcibly engaged with the adaptor body and the other of the opposed end rings. The end rings include flanges for engagement with elongated tension bolt assemblies to secure the sleeve body, the adaptor body, the gaskets and the end rings in assembly with each other.

10 Claims, 6 Drawing Sheets

U.S. PATENT DOCUMENTS

| | | |
|---|---|---|
| 4,627,774 A | 12/1986 | Bradley |
| 4,647,083 A | 3/1987 | Hashimoto |
| 4,648,631 A * | 3/1987 | Bryant ................. 285/148.25 |
| 4,664,426 A | 5/1987 | Ueki |
| 4,679,830 A * | 7/1987 | Kok ........................... 285/323 |
| 4,721,330 A * | 1/1988 | Woodhouse ........... 285/148.26 |
| 4,775,273 A | 10/1988 | Bauer |
| 4,779,900 A | 10/1988 | Shumard |
| 4,805,932 A | 2/1989 | Imhof et al. |
| 4,810,144 A | 3/1989 | Martelli |
| 4,848,808 A | 7/1989 | Pannell et al. |
| 4,896,903 A | 1/1990 | Shumard |
| 4,934,888 A | 6/1990 | Corsmeier et al. |
| 5,071,175 A | 12/1991 | Kennedy, Jr. |
| 5,082,313 A * | 1/1992 | Bryant et al. ................. 285/15 |
| 5,393,107 A | 2/1995 | Vobeck |
| 5,431,453 A | 7/1995 | Yamashita et al. |
| 5,476,292 A | 12/1995 | Harper |
| 5,544,922 A | 8/1996 | Shumard et al. |
| 5,772,252 A | 6/1998 | Malani |
| 5,833,277 A | 11/1998 | Reinert et al. |
| 6,086,111 A * | 7/2000 | Harper ....................... 285/55 |
| 6,168,210 B1 | 1/2001 | Bird |
| 6,173,993 B1 | 1/2001 | Shumard et al. |
| 6,203,073 B1 | 3/2001 | Sato et al. |
| 6,257,628 B1 | 7/2001 | Nijsen |
| 6,279,963 B1 | 8/2001 | Hulsebos |
| 6,467,813 B1 | 10/2002 | Takemura et al. |
| 6,481,762 B1 | 11/2002 | Rex et al. |

* cited by examiner

RESTRAINED SLEEVE PIPE COUPLING

BACKGROUND

In the art of pipe fittings, there has been a continuing need to provide a suitable coupling for connecting two sections of similar pipe or connecting a section of one type of pipe to a section of another type of pipe of generally the same diameter. The criteria for such couplings includes the requirement of restraining the pipe sections from axial separation from each other when subjected to forces generated by hydrostatic pressure as well as external forces tending to deflect or separate one pipe section from another.

Prior art couplings that provide for restraining the pipe sections from axial separation are typically subject to very limited applications, are somewhat cumbersome to install, and/or provide relatively low restraining or holding capability against fluid pressure and other forces acting on the coupled pipe sections. Accordingly, the need for an improved coupling or so-called restrained sleeve has included the desiderata of providing a device which is operable to join the plain ends of pipes of either similar or dissimilar materials, is mechanically uncomplicated, is easy to install and has the capability to maintain joined pipe sections coupled in a fluid tight relationship under substantial fluid pressures within the pipe sections. It is to these ends that the present embodiment has been developed.

BRIEF SUMMARY

The present embodiment provides an improved pipe coupling or so-called restrained sleeve for joining pipe sections together at adjacent ends thereof.

In accordance with one aspect of the present embodiment, a mechanically uncomplicated pipe coupling or restrained sleeve is provided which includes an elongated, generally cylindrical sleeve body and opposed end rings which are adapted to cooperate with the sleeve body to form a fluid tight joint and maintain the sleeve body in a position sleeved over the ends of adjacent pipe sections to maintain such pipe sections coupled to each other. The end rings are adapted to include circumferentially spaced wedge or pipe gripper members which are operable to forcibly grip a pipe section over which the end ring is sleeved so as to secure the end ring to the pipe section in a predetermined position. The end rings are also adapted to be interconnected by circumferentially spaced axially extending elongated tension bolts which hold the pipe sections joined by the coupling assembly in fluid tight coupled relationship.

In accordance with another aspect of the present embodiment, a pipe coupling or restrained sleeve assembly is provided which may be manufactured of conventional engineering materials used for pipe fittings and the like, is adapted to couple the plain ends of adjacent pipe sections in fluid tight sealed relationship to each other, wherein pipe sections may be of similar or dissimilar materials including ductile iron, polyvinylchloride and high density polyethylene, and such pipe sections being of so-called standard pipe sizes. The restrained sleeve assembly is easily connected to adjacent pipe sections and assembled to provide a fluid tight seal between the sleeve body and the coupled pipe sections and to further restrain the sleeve or coupling assembly axially with respect to the coupled pipe sections to form a secure fluid tight coupling. The sleeve or coupling assembly advantageously utilizes pipe gripping wedge members and limited torque bolt assemblies mounted on opposed end rings. The bolt assemblies are engageable with the wedge or gripper members to forcibly engage the members with the pipe sections over which the end rings are sleeved so as to provide a substantially secure non-slip connection between the end rings and the pipe sections.

In accordance with yet another aspect of the present embodiment, a pipe coupling or restrained sleeve is provided which includes a generally cylindrical sleeve body, a generally cylindrical adaptor body and opposed end rings which are adapted to cooperate with the sleeve body and the adaptor body to form a fluid tight joint and maintain the sleeve body in a position sleeved over the ends of adjacent pipe sections to maintain such pipe sections coupled to each other. The restrained sleeve assembly including the adaptor body is easily connected to adjacent pipe sections of dissimilar outside diameter and assembled to provide a fluid tight seal between the sleeve body, the adaptor body and the coupled pipe sections and to further restrain the sleeve or coupling assembly axially with respect to the coupled pipe sections to form a secure fluid tight coupling. The sleeve or coupling assembly also advantageously utilizes pipe gripping wedge members and limited torque bolt assemblies mounted on opposed end rings. The bolt assemblies are engageable with the wedge or gripper members to forcibly engage the members with the pipe sections over which the end rings are sleeved so as to provide a substantially secure non-slip connection between the end rings and the pipe sections.

Those skilled in the art will further appreciate the above-mentioned advantages and superior features of the present embodiment, together with other important aspects thereof upon reading the detailed description which follows in conjunction with the drawings.

DETAILED DESCRIPTION OF A PREFERRED EMBODIMENT

Figure 1:
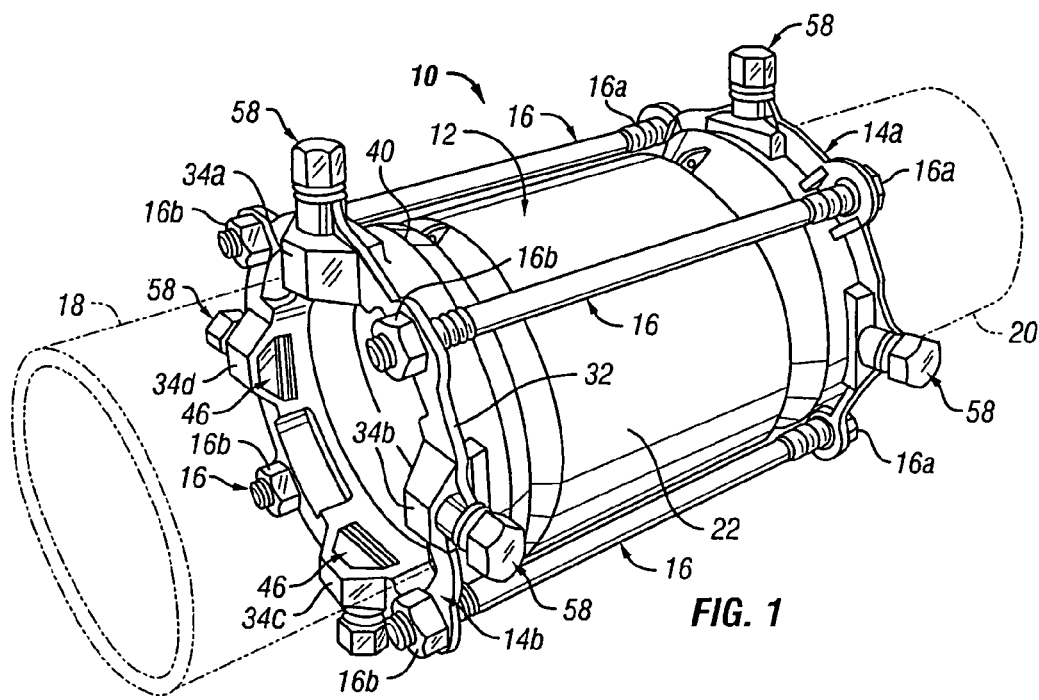
FIG. 1 is a perspective view of the pipe coupling or restrained sleeve assembly of the present embodiment shown connecting two adjacent coaxially aligned pipe sections to each other.

In the description which follows, like parts are marked throughout the specification and drawing with the same reference numerals, respectively. The drawing figures are not necessarily to scale in the interest of clarity and conciseness.

Referring to FIG. 1, there is illustrated a pipe coupling or so-called restrained sleeve assembly in accordance with the present embodiment and generally designated by the numeral 10. The sleeve assembly 10 includes a generally cylindrical tubular sleeve body 12 and opposed, generally cylindrical end rings 14*a* and 14*b* which are essentially identical members. The sleeve assembly 10 is shown in an assembled condition wherein the end ring members 14*a* and 14*b* are interconnected by fastener means preferably comprising four, equally circumferentially spaced elongated bolt and nut assemblies 16 to prevent axial separation of coaxially aligned adjacent pipe sections 18 and 20 over which the sleeve body 12 is disposed. The bolt and nut assemblies 16, each comprise a hex-head bolt 16*a* and hex nut 16*b* or may comprise elongated threaded stud members with nuts removably attached to each end. The pipe sections 18 and 20 may be of similar or dissimilar materials and may have at least slightly different inside and outside diameters.

One advantage of the sleeve assembly 10 is its ability to interconnect adjacent pipe sections which are made of the same material and have exactly the same dimensions or are made of different materials and have at least slightly different outside diameters (as well as inside diameters). In most applications of the sleeve assembly 10, the coupled or interconnected pipe sections 18 and 20 have the same or slightly different outside diameters, as shown, and plain ends, such as the ends 18*a* and 20*a*, as shown in FIG. 3.

Figure 3:
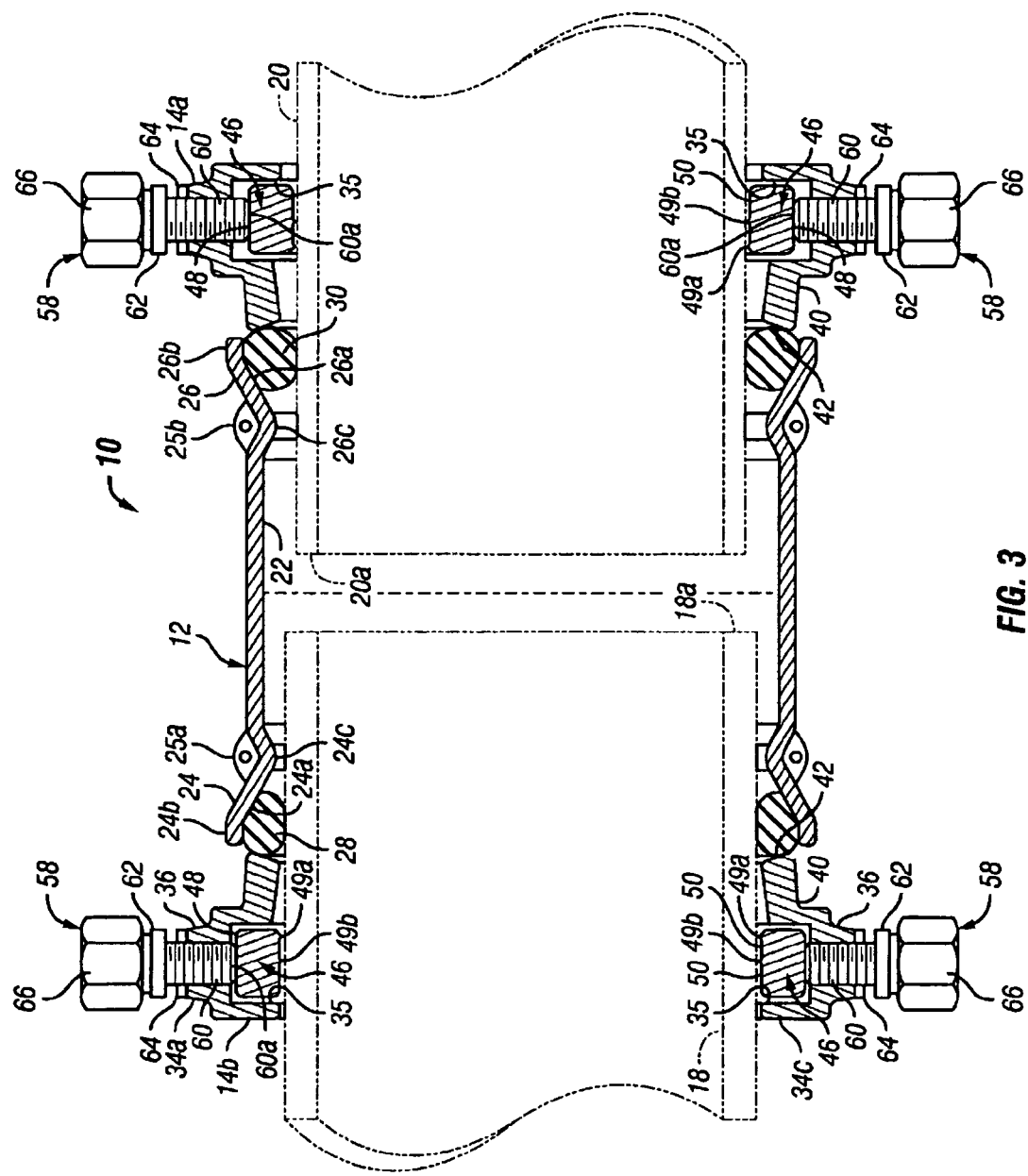
FIG. 3 is a longitudinal central section view of the coupling or sleeve assembly taken along line 3-3 of FIG. 2.

Referring further to FIG. 3, the sleeve body 12 comprises a generally cylindrical tubular middle section 22 extending over at least about half of the overall length of the sleeve body and opposed integral end sections 24 and 26 providing frustoconical gasket engagement surfaces 24*a* and 26*a*, as shown in FIG. 3. The opposite ends of sleeve body 12 are provided as relatively short, cylindrical sections 24*b* and 26*b* for receiving opposed ring shaped elastomer gaskets 28 and 30. Those skilled in the art will recognize that the ring shaped elastomer gaskets 28 and 30 shown in FIG. 3 may be replaced with conventional standard mechanical joint gaskets or transition gaskets depending upon the particular pipe type to be coupled or restrained. The frustoconical surfaces 24*a* and 26*a* terminate at their inner ends at reduced diameter, radially inwardly projecting ridges 24*c* and 26*c* which are of a diameter large enough to accommodate the requisite maximum pipe size for a given sleeve assembly, which also give strength and rigidity to the body 12 and delimit the surfaces 24*a* and 26*a* which extend between the ridges 24*c* and 26*c* and the cylindrical end sections 24*b* and 26*b*, respectively. The sleeve body 12 may also include one or more sets of spaced apart lifting rings 25*a* and 25*b*, as shown in FIG. 3.

Figure 2:
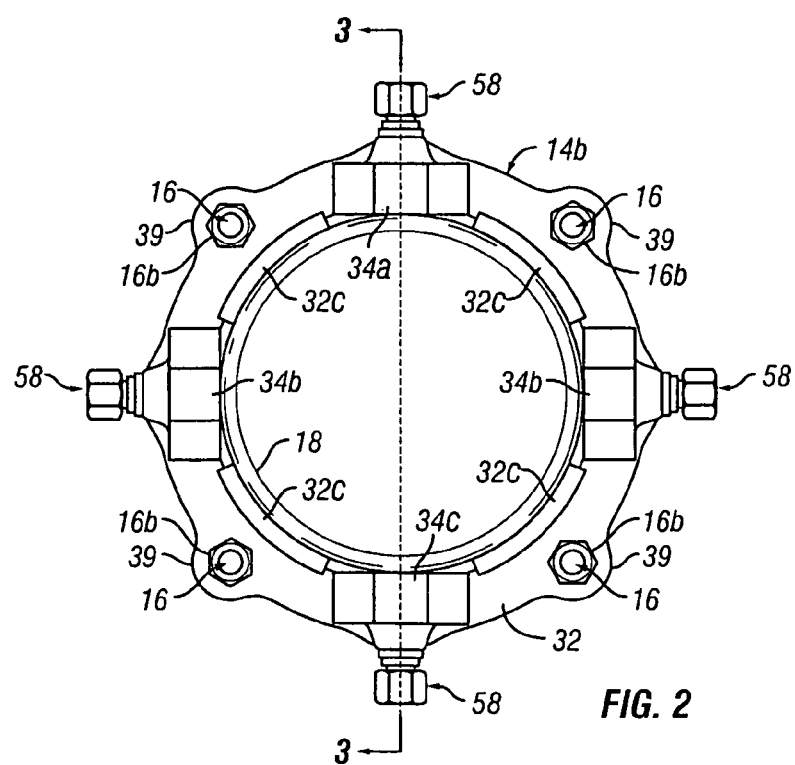
FIG. 2 is an end view of the coupling or sleeve assembly shown in FIG. 1.
Figure 5:
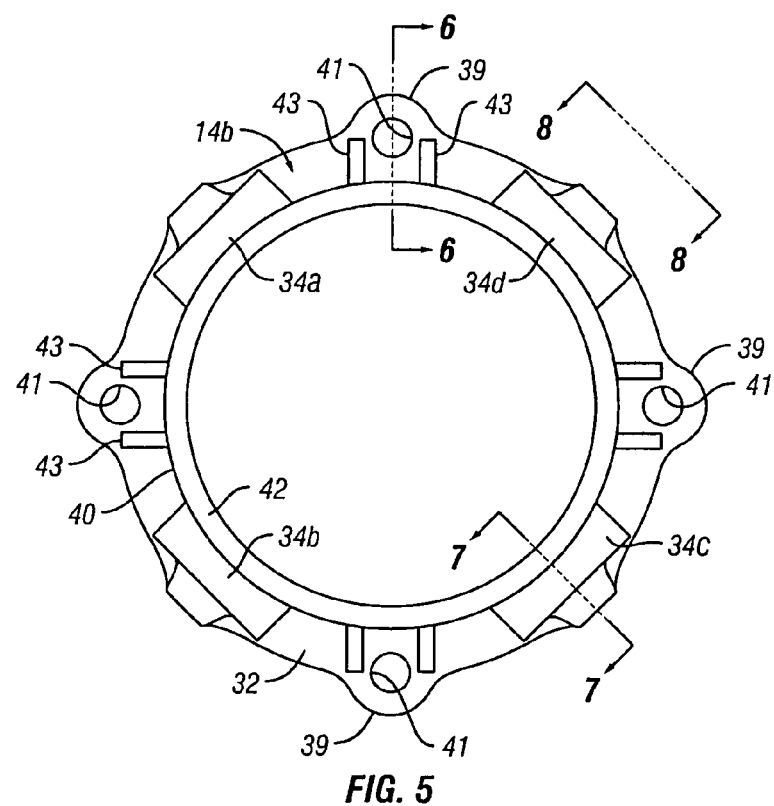
FIG. 5 is an end view of one of the end rings taken from the direction opposite that of FIG. 2.
Figure 6:
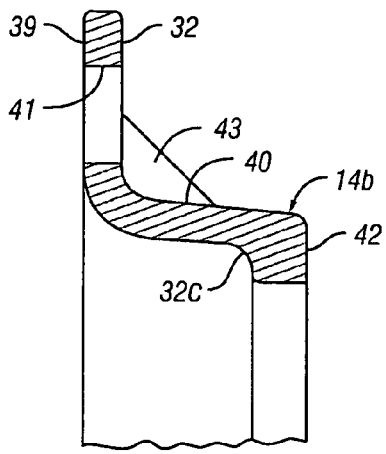
FIG. 6 is a detail section view taken along line 6-6 of FIG. 5.
Figure 7:
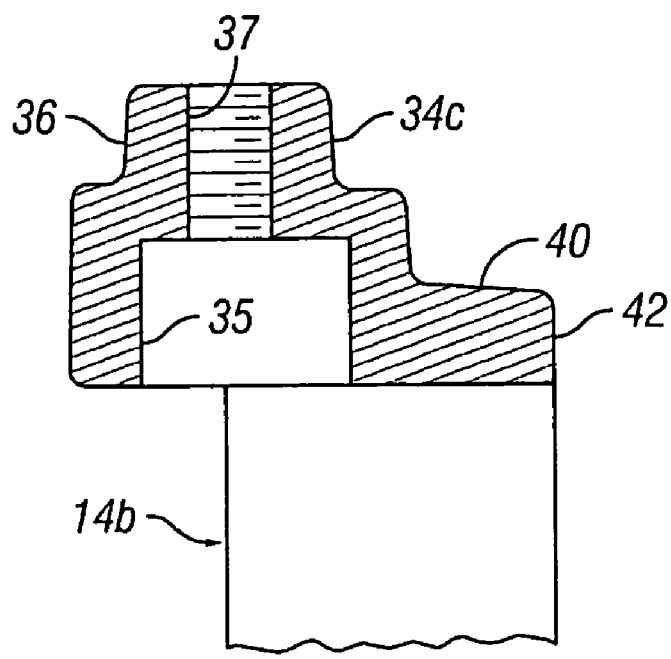
FIG. 7 is a detail section view taken along line 7-7 of FIG. 5.
Figure 8:
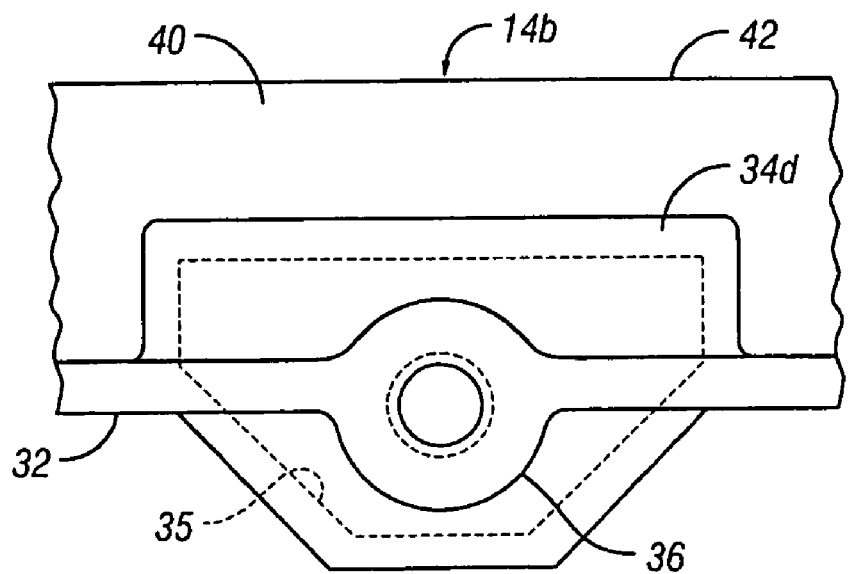
FIG. 8 is a detail view of one of the gripper member receptacles for the end ring shown in FIG. 5 and taken generally along line 8-8 of FIG. 5.

Referring further to FIGS. 2 and 3, and as mentioned previously, the end rings 14*a* and 14*b* are preferably of identical construction. End ring 14*b* is illustrated in FIGS. 2, 3 and 5 through 9 and the component portions thereof are identical in and form a part of end ring 14*a*. As shown in FIGS. 1 and 2, end ring 14*b* includes a substantially circumferential radially projecting, planar disc flange portion 32 and four circumferentially spaced wedge or gripper member receiving bosses 34*a*, 34*b*, 34*c* and 34*d* which project from both sides of the flange 32, as shown in FIGS. 2, 5 and 8. Each of the bosses 34*a*-34*d* has a polygonal cross-section and is also provided with a polygonal shaped receptacle 35 formed therein, see FIGS. 7 and 8 by way of examples. Each of the bosses 34*a*-34*d* also includes a radially outwardly projecting integral boss part 36 including a radial extending threaded bore 37, see FIGS. 7 and 8, opening into the recess 35, also shown in FIG. 7 by way of example. The end rings 14*a* and 14*b* each include a substantially cylindrical rim part 40, see FIGS. 2, 5 and 6, integrally formed with the flange part 32, FIG. 6, about the circumference thereof. The cylindrical rim part 40 terminates in a radially inturned integral circumferential flange forming a generally transverse end face 42 adapted for engaging one or the other of the gaskets 28 or 30, see FIG. 3 or the gasket 120, see FIG. 9. The cylindrical flange 32 includes, as shown in FIGS. 2 and 5, four equally spaced, somewhat radially outwardly disposed projections 39 and respective bolt receiving bores 41 extending through the flange, see FIG. 6 also. The flange 32 may be reinforced at the bolt receiving bores 41 by spaced-apart gussets 43, see FIGS. 5 and 6, which extend between the flange 32 and the cylindrical rim part 40 and are integrally formed therewith. As shown in FIG. 2, the flange 32 may be relieved slightly at locations 32*c* to maintain generally uniform metal thickness throughout the cross-sectional shape of the end rings 14*a* and 14*b*, respectively.

Figure 4:
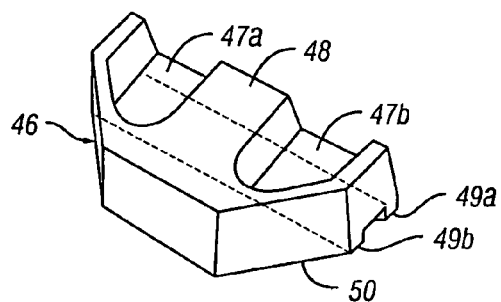
FIG. 4 is a detail perspective view of one of the pipe gripping members associated with the coupling or sleeve assembly of the present embodiment.
Figure 9:
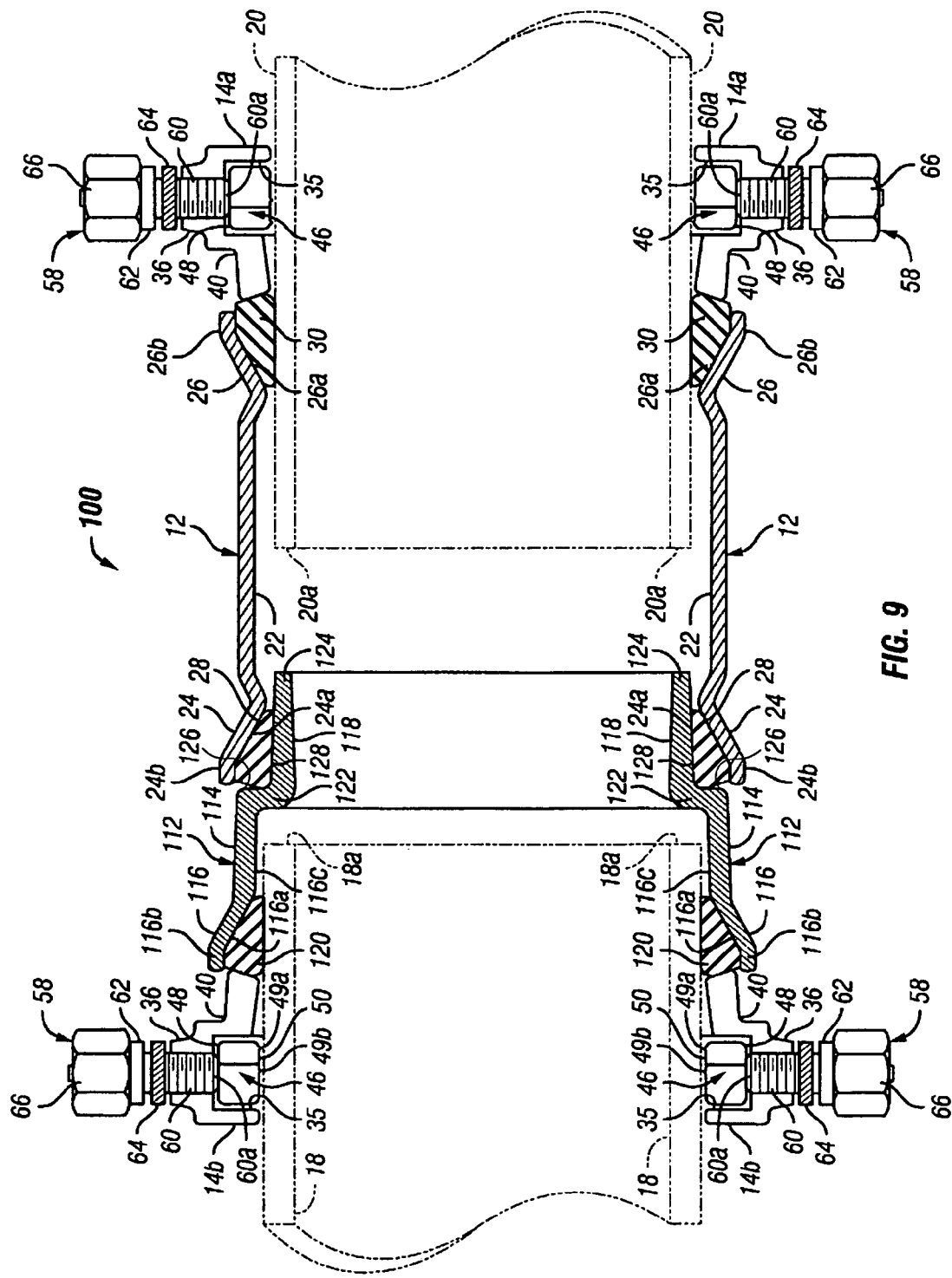
FIG. 9 is a longitudinal central section view of an alternate embodiment of the coupling or sleeve assembly taken along line 3-3 of FIG. 2.

Referring briefly to FIGS. 3, 4 and 9, each of the end rings 14*a* and 14*b* is adapted to support within its respective polygonal recesses 35, a moveable pipe gripper or wedge member 46. Each gripper member 46 has a polygonal cross-sectional shape, corresponding somewhat to the shape of the recess 35, and opposed lightening recesses 47*a* and 47*b*, FIG. 4, with a bolt engaging anvil 48 disposed therebetween. The gripper or wedge members 46 include two spaced-apart integrally formed elongated parallel teeth 49*a* and 49*b* projecting from a bottom surface 50, see FIGS. 3, 4 and 9. The elongated linear teeth 49*a* and 49*b* are operable to grip the outer surface of a pipe section, such as a pipe section 18 or 20, for forcibly retaining the pipe section connected to or restrained by the sleeve or coupling assembly 10 or 100. The wedge or gripper members 46 are disposed in respective ones of the recesses 35 and may be suitably retained therein by elastomeric material, such as opposed dabs of silicone rubber, not shown.

Referring further to FIGS. 2, 3 and 9, each of the bosses 36 is operable to receive within its threaded bore 37 a limited torque bolt assembly 58 having, as shown in FIGS. 3 and 9, a threaded shank portion 60 including a circumferential washer face portion 62 and a washer 64 sleeved thereover. Each bolt assembly 58 also includes a limited torque hex-head 66 comprising a hex shaped nut which is engageable with a frangible drivehead of the bolt assembly to shear same to expose a secondary drive head, not shown in the drawing figures. For example, each of the limited torque bolt assemblies 58 may be of the type described in U.S. Pat. No. 4,627,774 issued Dec. 9, 1986 to Earl T. Bradley and assigned to the assignee of the present embodiment.

As shown in FIGS. 3 and 9, the distal end 60*a* of each bolt assembly 58 is engageable with the anvil surface 48 of a wedge or gripper member 46 to displace same into forcible engagement with the outer circumferential surface of a pipe section 18 or 20, as shown. Accordingly, each of the bolt assemblies 58 may not be over-tightened to strip the threads of either the bolt shank 60 or the threads of the bores 37 or possibly damage the grippers 46 or the pipe sections 18 or 20 to which the end rings 14*a* and 14*b* are being secured.

The gripper or wedge members 46 may be similar in some respects to the wedges or grippers described and claimed in U.S. Pat. No. 6,173,993 issued Jan. 16, 2001 to Dennis D. Shumard and Michael L. Lundstrom and assigned to the assignee of the present embodiment. The subject matter of U.S. Pat. Nos. 4,627,774 and 6,173,993 is incorporated by reference herein.

The coupling or sleeve assembly 10 may be assembled to join two pipe sections, such as the pipe sections 18 and 20, together by sleeving the end rings 14*a* and 14*b* over the respective pipe sections along with disposing the sleeve body 12 over each of the pipe sections or inserting each of the pipe sections within the sleeve body, generally as shown in FIG. 3. One or the other of the end rings 14*a* and 14*b* may be tightly secured to its associated pipe section by tightening the limited torque bolts 58 and associated gripper members 46 to engage the pipe section over which it is sleeved. The sleeve assembly 10 may then be further assembled by inserting the elongated bolts 16 through the bolt receiving bores 41 of each of the end rings 14*a* and 14*b* and tightening the bolts to draw the other of the end rings and sleeve body toward the end ring which is fixed to its pipe section so as to compress the gaskets 28 and 30 to the positions, substantially as shown in FIG. 3, whereby the gaskets forcibly engage the outer circumferential surfaces of the pipe sections 18 and 20 and also engage the gasket surfaces 24*a* and 26*a* in fluid tight sealing relationship. After tightening of the bolt assemblies 16 to sufficiently compress the gaskets 28 and 30, the other of the end rings 14*a* and 14*b* may be secured to its pipe section by tightening the respective bolt assemblies 58 until the nutlike heads 66 shear off to expose the secondary driveheads discussed above.

Accordingly, a fluid-tight high pressure sleeve or coupling assembly is advantageously provided in accordance with the embodiment described hereinabove. In the assembly of the coupling or sleeve assembly 10 to join two pipe sections together as shown in FIGS. 1 and 3, the bolt assemblies 16 may be tightened at least slightly before the end rings 14*a* and 14*b* and sleeve body 12 are moved to their final position with respect to the pipe sections 18 and 20 and the bolt assemblies then tightened before the wedge or gripper members 46 on either one of the end rings 14*a* or 14*b* are tightened to forcibly grip the pipe section over which that end ring is sleeved. However, once one of the end rings 14*a* and 14*b* has been properly located with respect to the pipe ends 18*a* or 20*a* of the associated pipe sections, it may be advantageous to tighten the one ring to the pipe section so that the best position of the coupling assembly 10 is substantially retained when the bolts 16 are tightened to pull the end rings 14*a* and 14*b* toward each other and in forcible engagement with the gaskets 28 and 30.

Referring to FIG. 9, there is illustrated a pipe coupling in accordance with an alternate embodiment and generally designated by the reference numeral 100. Similar to the pipe coupling 10 shown in FIGS. 1 and 3, the pipe coupling 100 includes a generally cylindrical tubular sleeve body 12 and opposed, generally cylindrical end rings 14*a* and 14*b*. Cylindrical end rings 14*a* and 14*b* are essentially identical members except that end ring 14*b* has a larger inside diameter compared to end ring 14*a*. The cylindrical end rings 14*a* and 14*b* are interconnected in the same manner as described in connection with FIG. 1 except that the circumferentially spaced elongated bolt and nut assemblies 16 which prevent axial separation of coaxially aligned adjacent pipe sections 18 and 20 over which the sleeve body 12 is disposed may include spherical nuts to accommodate the axial misalignment of the bolts due to the larger diameter of end ring 14*b* compared to end ring 14*a*.

In a manner similar to the embodiment shown in FIG. 3, the sleeve body 12 comprises a generally cylindrical tubular middle section 22 and opposed integral end sections 24 and 26 providing frustoconical gasket engagement surfaces 24*a* and 26*a*. The opposite ends of sleeve body 12 are provided as relatively short, cylindrical sections 24*b* and 26*b* for receiving opposed gasket elements 28 and 30.

As shown in FIG. 9, the pipe coupling 100 includes an adaptor bell 112. The adaptor bell 112 is interposed between the sleeve body 12 and the end ring 14*b*. Those skilled in the art will recognize that a pipe coupling 100 that includes the adaptor bell 112 may be advantageously employed in situations where the outside diameter of the pipe section 18 is larger than the inside diameter capacity of the sleeve body 12 and the associated gasket elements 28 and 30. The adaptor bell 112 essentially permits the coupling and restraint of two pipes of dissimilar outside diameter and is especially useful for joining pit cast grey iron pipe to conventional ductile iron or PVC pipe.

As shown in FIG. 9, the adaptor bell 112, includes a generally cylindrical tubular middle section 114 and opposed integral end sections 116 and 118. The end section 116 provides a frustoconical gasket engagement surface 116*a*. The end 116*b* of adaptor bell 112 is provided as a relatively short, cylindrical section 116*b* for receiving a ring shaped elastomer gasket 120. The frustoconical surface 116*a* terminates at its inner end at a reduced diameter, radially inward projection ridge 116*c* which is of a diameter large enough to accommodate the requisite maximum pipe size for a given sleeve assembly.

The adaptor bell 112 includes a substantially circumferentially radially projecting, planar disc flange portion 122 integrally formed with the middle section 114. The adaptor bell 112 also includes a cylindrical rim part 124 integrally formed with the flange portion 122 about the circumference thereof. The flange portion 122 forms a generally transverse end face 126 adapted for engaging the gasket 28 and rim part 124 forms a generally axial face 128 adapted for supporting the gasket 28.

The coupling or sleeve assembly 100 may be assembled to join two pipe sections, such as the pipe sections 18 and 20, together by sleeving the end rings 14*a* and 14*b* over the respective pipe sections along with disposing the sleeve body 12 over each of the pipe sections or inserting each of the pipe sections within the sleeve body, generally as shown in FIG. 9. In a manner similar to the embodiment shown and described in FIG. 3, one or the other of the end rings 14*a* and 14*b* may be tightly secured to its associated pipe section by tightening the limited torque bolts 58 and associated gripper members 46 to engage the pipe section over which it is sleeved. The sleeve assembly 100 may then be further assembled by inserting the elongated bolts through the bolt receiving bores of each of the end rings 14*a* and 14*b* and tightening the bolts to draw the other of the end rings and sleeve body toward the end ring which is fixed to its pipe section so as to compress the gaskets 28, 30 and 120 to the positions, substantially as shown in FIG. 9, whereby the gaskets forcibly engage the outer circumferential surfaces of the pipe sections 18 and 20, as well as the axial face 128 of adaptor bell 112 and also engage the gasket surfaces 24*a*, 26*a* and 116*a* in fluid tight sealing relationship. After tightening of the bolt assemblies to sufficiently compress the gaskets 28, 30 and 120, the other of the end rings 14*a* and 14*b* may be secured to its pipe section by tightening the respective bolt assemblies 58 until the nutlike heads 66 shear off to expose the secondary driveheads discussed above.

Accordingly, a fluid-tight high pressure sleeve or coupling assembly is advantageously provided in accordance with the embodiment described hereinabove. In the assembly of the coupling or sleeve assembly 100 to join two pipe sections together as shown in FIG. 9, the bolt assemblies may be tightened at least slightly before the end rings 14a and 14b and sleeve body 12 are moved to their final position with respect to the pipe sections 18 and 20 and the bolt assemblies then tightened before the wedge or gripper members 46 on either one of the end rings 14a or 14b are tightened to forcibly grip the pipe section over which that end ring is sleeved. However, once one of the end rings 14a and 14b has been properly located with respect to the pipe ends 18a or 20a of the associated pipe sections, it may be advantageous to tighten the one ring to the pipe section so that the best position of the coupling assembly 100 is substantially retained when the bolts are tightened to pull the end rings 14a and 14b toward each other and in forcible engagement with the gaskets 28, 30 and 120.

Figure 10:
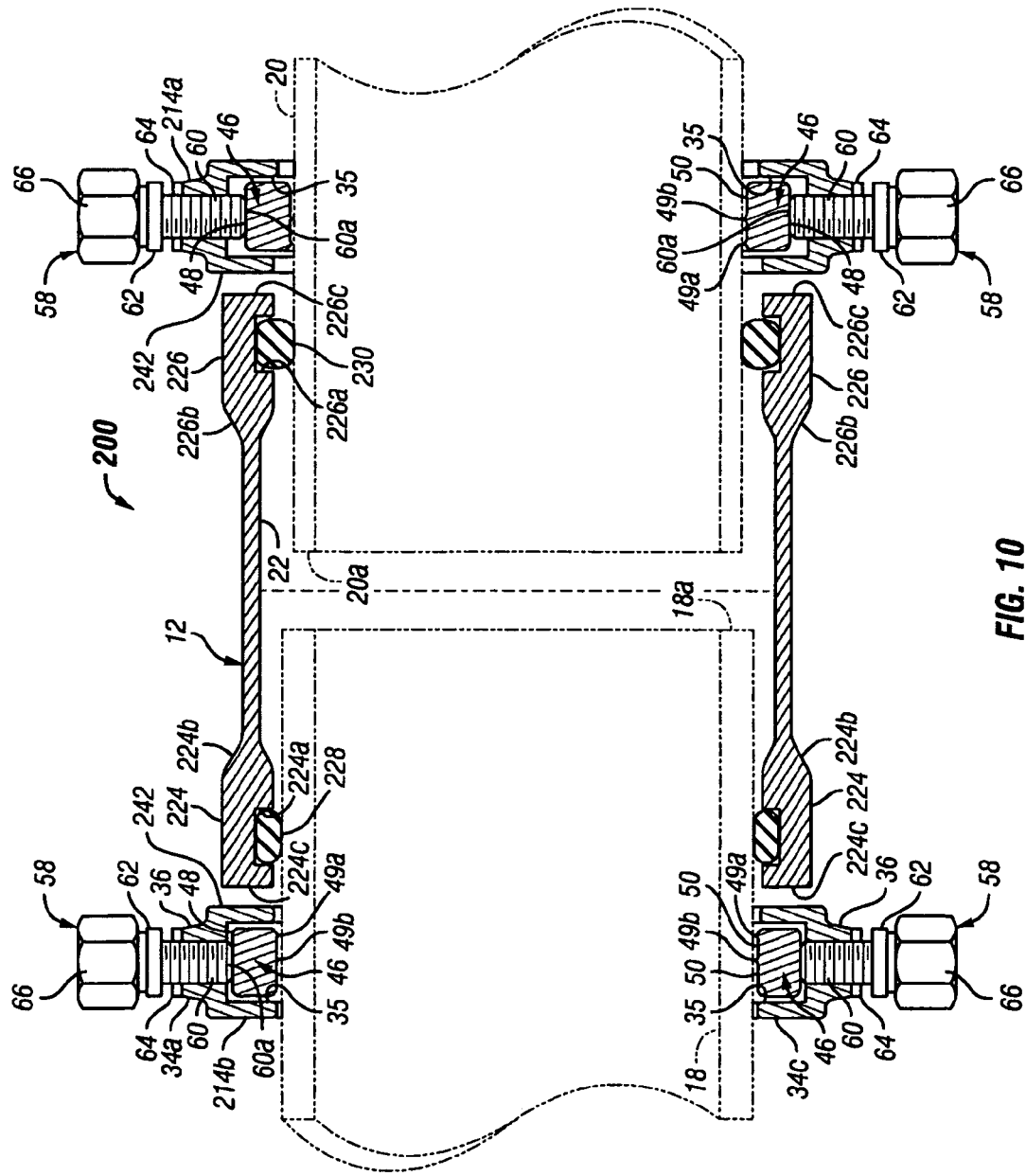
FIG. 10 is a longitudinal central section view of an alternate embodiment of the coupling or sleeve assembly taken along line 3-3 of FIG. 2.

Referring to FIG. 10, there is illustrated a pipe coupling in accordance with an alternate embodiment and generally designated by the reference numeral 200. Similar to the pipe coupling 10 shown in FIGS. 1 and 3, the pipe coupling 200 includes a generally cylindrical tubular sleeve body 212 and opposed, generally cylindrical end rings 214a and 214b. Cylindrical end rings 214a and 214b are essentially identical to end rings 14a and 14b as shown in FIGS. 1 and 3, except that cylindrical end rings 214a and 214b do not include a cylindrical rim part 40 integrally formed with the flange part 32 but instead include a generally transverse end face 242 adapted for abuttingly engaging an end face of the sleeve body 212. The cylindrical end rings 214a and 214b are interconnected in the same manner as described in connection with FIG. 1.

In a manner similar to the embodiment shown in FIG. 3, the sleeve body 212 comprises a generally cylindrical tubular middle section 222 and opposed integral end sections 224 and 226. End section 224 includes a recess 224a and end section 226 includes a recess 226a for housing a conventional O-ring gasket 228 and 230, respectively. Preferably as shown in FIG. 10, the generally cylindrical tubular middle section 222 of sleeve body 212 is relatively thin compared to end sections 224 and 226. Also, it is preferred that sleeve body 212 include transition sections 224b and 226b of generally increasing diameter between the middle section 222 and the end sections 224 and 226, respectively. End section 224 terminates in a generally transverse end face 224c and end section 226 terminates in a generally transverse end face 226c.

The coupling or sleeve assembly 200 may be assembled to join two pipe sections, such as the pipe sections 18 and 20, together by sleeving the end rings 214a and 214b over the respective pipe sections along with inserting each of the pipe sections 18 and 20 within the sleeve body 212, generally as shown in FIG. 10, whereby the O-rings 228 and 230 forcibly engage the outer circumferential surfaces of the pipe sections 18 and 20 in fluid tight sealing relationship. In a manner similar to the embodiment shown and described in FIG. 3, one or the other of the end rings 214a and 214b may be tightly secured to its associated pipe section by tightening the limited torque bolts 58 and associated gripper members 46 to engage the pipe section over which it is sleeved. The sleeve assembly 200 may then be further assembled by inserting the elongated bolts through the bolt receiving bores of each of the end rings 214a and 214b and tightening the bolts to draw the other of the end rings and sleeve body toward the end ring which is fixed to its pipe section so as to bring the transverse end face 242 of each of the end rings 214a and 214b into abutting engagement with the end faces 224c and 226c of the sleeve body, respectively, substantially as shown in FIG. 10. After tightening of the bolt assemblies to bring each of the transverse end faces 242 of the end rings 214a and 214b into abutting engagement with the end faces 224c and 226c of the sleeve body, the other of the end rings 214a and 214b may be secured to its pipe section by tightening the respective bolt assemblies 58 until the nutlike heads 66 shear off to expose the secondary driveheads discussed above.

Accordingly, a fluid-tight high pressure sleeve or coupling assembly is advantageously provided in accordance with the embodiment described hereinabove. In the assembly of the coupling or sleeve assembly 200 to join two pipe sections together as shown in FIG. 10, the bolt assemblies may be tightened at least slightly before the end rings 214a and 214b and sleeve body 212 are moved to their final position with respect to the pipe sections 18 and 20 and the bolt assemblies then tightened before the wedge or gripper members 46 on either one of the end rings 214a or 214b are tightened to forcibly grip the pipe section over which that end ring is sleeved. However, once one of the end rings 214a and 214b has been properly located with respect to the pipe ends 18a or 20a of the associated pipe sections, it may be advantageous to tighten the one ring to the pipe section so that the best position of the coupling assembly 200 is substantially retained when the bolts are tightened to pull the end rings 214a and 214b toward each other and in abutting engagement with the transverse ends 224c and 226c of the sleeve body 212.

The construction and use of the sleeve or coupling assembly 10 may be carried out in accordance with known processes for manufacturing pipe fittings and the like. The materials used in constructing the components of the sleeve assemblies 10, 100 and 200 may be standard for the industry and known to those skilled in the art. For example, the sleeve body 12 and 212 and the end rings 14a and 14b or 214a and 214b may be formed of cast ductile iron and the gaskets 28, 30 and 120 formed of suitable elastomers. The wedge or gripper members 46 may also be formed of cast or forged steel with hardened gripper teeth 49a and 49b. The bolt assemblies 58 may be formed in accordance with known practices for high strength threaded fasteners. Accordingly, it is believed that those skilled in the art will be able to practice the present embodiment based on the foregoing description.

Although preferred embodiments have been described in detail herein, those skilled in the art will recognize that various substitutions and modification may be made without departing from the scope and spirit of the appended claims.

What is claimed is:

1. A system in combination, comprising:
a first pipe section;
a second pipe section, wherein the second pipe section has a larger outside diameter than the first pipe section;
a generally cylindrical sleeve body disposed in sleeved relationship around the first pipe section, the sleeve body having opposed ends, opposed first and second gasket engagement surfaces thereon and an inside diameter capacity, wherein the outside diameter of the second pipe section is larger than the inside diameter capacity of the sleeve body;

a generally cylindrical adaptor body having a gasket engagement surface at a first end thereof and a gasket support surface at a second end thereof;

a first flexible gasket disposed in sleeved relationship around the first pipe section, the first flexible gasket engaged with the first gasket surface of the sleeve body and having an inside diameter capacity, wherein the outside diameter of the second pipe section is larger than the inside diameter capacity of the first flexible gasket;

a second flexible gasket engaged with the second gasket surface of the sleeve body and the gasket support surface of the adaptor body, the second flexible gasket having an inside diameter capacity, wherein the outside diameter of the second pipe section is larger than the inside diameter capacity of the second flexible gasket, and wherein the gasket support surface of the adaptor body axially supports the second flexible gasket and the second gasket engagement surface of the sleeve body;

a third flexible gasket disposed in sleeved relationship around the second pipe section, the third flexible gasket engaged with the gasket engagement surface of the adaptor body; and first and second opposed end rings disposed in sleeved relationship around the first and second pipe sections, the second end ring having a larger inside diameter than the first end ring, the first and second end rings including circumferentially spaced bosses formed thereon, respectively, and respective pipe gripper members supported at the bosses and operable for gripping a surface of the first and second pipe sections, respectively, the first and second end rings engaged with the first and third flexible gaskets, respectively, to form a fluid tight coupling.

2. The system set forth in claim 1 wherein:

the gasket surfaces of the sleeve body comprise opposed, frustoconical surfaces facing away from each other.

3. The system set forth in claim 2 wherein:

the sleeve body includes spaced-apart circumferential radially inwardly projecting ridges delimiting the gasket surfaces, respectively.

4. The system set forth in claim 1 wherein:

the end rings include circumferential rim portions each having an end face engageable with the first and third flexible gaskets, respectively.

5. The system set forth in claim 1 wherein:

the bosses each include recesses formed therein for receiving the gripper members.

6. The system set forth in claim 5 wherein:

the gripper members include respective gripping teeth thereon for being forcibly engaged with a surface of a pipe section.

7. The system set forth in claim 1 including:

respective threaded fasteners supported at the bosses and operable to forcibly engage the gripper members for forcing the gripper members into gripping engagement with a pipe section.

8. The system set forth in claim 7 wherein:

the fasteners include limited torque heads formed thereon operable to limit torque exerted on the fasteners, respectively.

9. The system set forth in claim 1 including:

plural elongated fasteners engageable with the end rings for securing the end rings to each other.

10. The system set forth in claim 9 wherein: the end rings include circumferential flange portions and spaced-apart bolt receiving openings formed in the flange portions for receiving respective bolt assemblies comprising the fasteners.

* * * * *